(12) United States Patent
Yabuuchi et al.

(10) Patent No.: US 12,134,365 B2
(45) Date of Patent: Nov. 5, 2024

(54) GAS GENERATOR (71) Applicant: NIPPON KAYAKU KABUSHIKI KAISHA, Chiyoda-ku (JP)

(72) Inventors: Shinya Yabuuchi, Himeji (JP); Yoshiki Tsutsumi, Himeji (JP); Kouichi Nakamura, Himeji (JP); Petr Holub, Vsetin (CZ); Radek Simara, Vsetin (CZ)

(73) Assignee: NIPPON KAYAKU KABUSHIKI KAISHA, Chiyoda-ku (JP)

( * ) Notice: Subject to any disclaimer, the term of this patent is extended or adjusted under 35 U.S.C. 154(b) by 131 days.

(21) Appl. No.: 17/423,263

(22) PCT Filed: Jan. 17, 2020

(86) PCT No.: PCT/JP2020/001472
§ 371 (c)(1),
(2) Date: Jul. 15, 2021

(87) PCT Pub. No.: WO2020/149399
PCT Pub. Date: Jul. 23, 2020

(65) Prior Publication Data
US 2022/0126784 A1 Apr. 28, 2022

(30) Foreign Application Priority Data
Jan. 18, 2019 (JP) .................................. 2019-007062

(51) Int. Cl.
*B60R 22/46* (2006.01)
*F42B 3/04* (2006.01)

(52) U.S. Cl.
CPC ............ *B60R 22/4628* (2013.01); *F42B 3/04* (2013.01)

(58) Field of Classification Search
CPC ... F42B 3/04; F42B 3/10; B60R 21/26; B60R 22/4628
(Continued)

(56) References Cited

U.S. PATENT DOCUMENTS

2004/0160046 A1  8/2004  Tanaka et al.
2006/0208474 A1  9/2006  Kubo et al.
(Continued)

FOREIGN PATENT DOCUMENTS

CN  1938181 A  3/2007
CN  201159346 Y  12/2008
(Continued)

OTHER PUBLICATIONS

Description Translation for JP 2001/191891 from Espacenet (Year: 2001).*
(Continued)

*Primary Examiner* — Jason D Shanske
*Assistant Examiner* — Daniel M. Keck
(74) *Attorney, Agent, or Firm* — Oblon, McClelland, Maier & Neustadt, L.L.P.

(57) ABSTRACT

A gas generator includes a substantially cylindrical cup with bottom where a gas generating agent is accommodated, the cup including one axial end as an opening end, and a substantially columnar holder to which the cup is coaxially assembled to close the opening end, the holder holding an igniter such that an ignition portion faces the gas generating agent. An annular step portion is provided at a periphery of an axial end of the holder on a side facing the cup. The cup is fixed to the holder by fitting the opening end to the annular step portion and providing an annular welded portion at the opening end, the annular welded portion being joined to the annular step portion so as to extend along a circumferential direction of the cup.

4 Claims, 4 Drawing Sheets (58) Field of Classification Search
USPC .................................................. 280/736, 806
See application file for complete search history.

(56) References Cited

U.S. PATENT DOCUMENTS

| | | | | |
|---|---|---|---|---|
| 2007/0096451 | A1* | 5/2007 | Stevens | B60R 21/2644 60/632 |
| 2007/0193464 | A1 | 8/2007 | Hironaka et al. | |
| 2008/0069740 | A1* | 3/2008 | Kitayama | B60R 21/272 422/163 |

FOREIGN PATENT DOCUMENTS

| | | | |
|---|---|---|---|
| CN | 103791196 A | 5/2014 | |
| CN | 104040284 A | 9/2014 | |
| CN | 104812633 A | 7/2015 | |
| CN | 105050867 A | 11/2015 | |
| DE | 102006059222 A1 | 6/2008 | |
| EP | 1 227 294 A1 | 7/2002 | |
| EP | 1 854 680 A2 | 11/2007 | |
| JP | 2001-191891 A | 7/2001 | |
| JP | 2001-260815 A | 9/2001 | |
| JP | 2002090097 A * | 3/2002 | ......... B60R 21/2644 |
| JP | 2002-346371 A | 12/2002 | |
| JP | 2003-146182 A | 5/2003 | |
| JP | 2005-280585 A | 10/2005 | |
| JP | 2006-142286 A | 6/2006 | |
| JP | 3134430 U | 8/2007 | |
| JP | 2010-208390 A | 9/2010 | |
| JP | 2012-91110 A | 5/2012 | |
| JP | 2018-140649 A | 9/2018 | |
| WO | 99/00275 A1 | 1/1999 | |
| WO | WO 02/092400 A1 | 11/2002 | |
| WO | WO 2004/059239 A1 | 7/2004 | |

OTHER PUBLICATIONS

International Search Report issued on Mar. 31, 2020 in PCT/JP2020/001472 filed on Jan. 17, 2020, 3 pages.

Chinese Office Action issued in Chinese Patent Application No. 202080009746.2 on Nov. 3, 2023, (w/ English Translation.

Chinese Office Action issued in Chinese Patent Application No. 202080009746.2 on Aug. 15, 2024, (w/ English Translation), citing documents 15-17 therein.

* cited by examiner

GAS GENERATOR

TECHNICAL FIELD

The present invention relates to a gas generator and particularly to a compact gas generator constructed to generate a relatively small amount of gas at the time of activation.

BACKGROUND ART

From a point of view of protection of a driver and/or a passenger in a car, a seat belt apparatus representing a passenger protection apparatus has conventionally widely been used. The seat belt apparatus is equipped for the purpose of protecting a driver and/or a passenger against shock caused at the time of collision of a vehicle, and it restrains the driver and/or the passenger to a seat by putting a belt around a body of the driver and/or the passenger. The driver and/or the passenger are/is thus prevented from being thrown within or out of the vehicle at the time of collision of the vehicle.

Among seat belt apparatuses, a seat belt apparatus including what is called a pretensioner incorporates therein a compact gas generator referred to as a micro gas generator. The pretensioner is an apparatus that instantaneously winds up, at the time of sensing of collision of a vehicle or the like, the seat belt loosened due to a thickness of clothing. Such a function is performed by strong drawing of one end of the seat belt by a pressure of gas provided from the gas generator.

The compact gas generator is extremely smaller in total amount of gas generated at the time of activation than a large-sized gas generator referred to as an inflator suitably incorporated in an air bag apparatus. Accordingly, a structure of the compact gas generator is significantly different.

For example, Japanese Patent Laying-Open No. 2012-91110 (PTL 1) discloses a specific structure of a gas generator of this type. The gas generator disclosed in this literature includes a cup in which a gas generating agent is accommodated and a holder to which the cup described above is assembled, the holder holding an igniter. The cup is assembled to the holder by what is called fixing by swaging.

Specifically, in the gas generator disclosed in the literature, a flange extending outward is provided at an opening end of the cup and a swaging collar is provided at an axial end of the holder on a cup side. As the swaging collar is bent inward to lock the flange, the cup is fixed to the holder.

From a point of view of facilitated swaging works or reduction in weight of the gas generator as a whole, the cup and the holder described above are both generally made of an aluminum-based material.

CITATION LIST

Patent Literature

PTL 1: Japanese Patent Laying-Open No. 2012-91110

SUMMARY OF INVENTION

Technical Problem

In fixing the cup to the holder by fixing by swaging as disclosed in the literature, in order to ensure sealability at a boundary between the cup and the holder, a liquid sealant should be applied in advance to one of portions of contact between the cup and the holder and then cured. As a manufacturing process thus becomes complicated, manufacturing cost increases.

What is called burr may also be produced in bending the swaging collar described above. Works for removing the burr are not easy, which is also a factor for increase in manufacturing cost. In addition, buckling may also occur in the holder in bending the swaging collar described above. When buckling occurs, yield also becomes poor.

Furthermore, as described above, the flange is provided at the opening end of the cup and the swaging collar is provided in the holder to lock the flange. Therefore, the holder naturally has a large maximum outer dimension in a radial direction, which poses a major obstacle in reduction in size of the gas generator.

Therefore, the present invention was made in order to solve the problems described above, and an object thereof is to provide a gas generator that is readily manufactured with lower cost and can be compact.

Solution To Problem

A gas generator based on the present invention includes a gas generating agent, an igniter, a cup, and a holder. The gas generating agent generates gas as it burns. The igniter includes an ignition portion loaded with an ignition agent and a terminal pin connected to the ignition portion. The cup is made from a substantially cylindrical member with bottom where the gas generating agent is accommodated, the cylindrical member including one axial end as an opening end. The holder is made from a substantially columnar member to which the cup is coaxially assembled to close the opening end, the columnar member holding the igniter such that the ignition portion faces the gas generating agent. An annular step portion is provided at a periphery of an axial end of the holder on a side facing the cup. In the gas generator based on the present invention, the cup is fixed to the holder by fitting the opening end to the annular step portion and providing an annular welded portion at the opening end, the annular welded portion being joined to the annular step portion so as to extend along a circumferential direction of the cup.

In the gas generator based on the present invention, preferably, a maximum outer dimension in a radial direction of the cup including the annular welded portion is equal to or smaller than a maximum outer dimension in the radial direction of the holder.

In the gas generator based on the present invention, preferably, a maximum outer dimension in a radial direction of the cup in a portion except for the annular welded portion is smaller than a maximum outer dimension in the radial direction of the holder.

In the gas generator based on the present invention, the igniter may further include a base in which the terminal pin is inserted and held. The holder may include a first recess provided at the axial end on the side facing the cup, the first recess accepting and holding the base, a second recess provided at an axial end on a side not facing the cup, the terminal pin being arranged in the second recess, the second recess accepting and holding a connector for external connection of the igniter with the terminal pin being interposed, and a partition portion that serves as a partition between the first recess and the second recess by defining a bottom surface of the first recess and a bottom surface of the second recess, the partition portion being provided with an opening in which the igniter is inserted. In that case, preferably, the annular step portion is provided to reach an outer peripheral surface of the holder in a portion of the holder surrounding the partition portion, and the annular welded portion is provided in a portion of the opening end that surrounds the partition portion.

In the gas generator based on the present invention, preferably, the annular welded portion is a laser welded portion where the opening end is joined to the annular step portion by laser welding.

In the gas generator based on the present invention, preferably, the cup and the holder are both made of an iron-based material.

In the gas generator based on the present invention, the outer peripheral surface of the holder may gradually decrease in diameter from the axial end of the holder on the side not facing the cup toward the annular step portion.

Advantageous Effects Of Invention

According to the present invention, a gas generator that is readily manufactured with lower cost and can be compact can be provided.

DESCRIPTION OF EMBODIMENTS

An embodiment of the present invention will be described hereinafter in detail with reference to the drawings. An embodiment shown below represents application of the present invention to a gas generator (what is called a micro gas generator) suitably incorporated in a seat belt apparatus including a pretensioner. The same or common elements in an embodiment shown below have the same reference characters allotted in the drawings and description thereof will not be repeated.

First Embodiment

Figure 1:
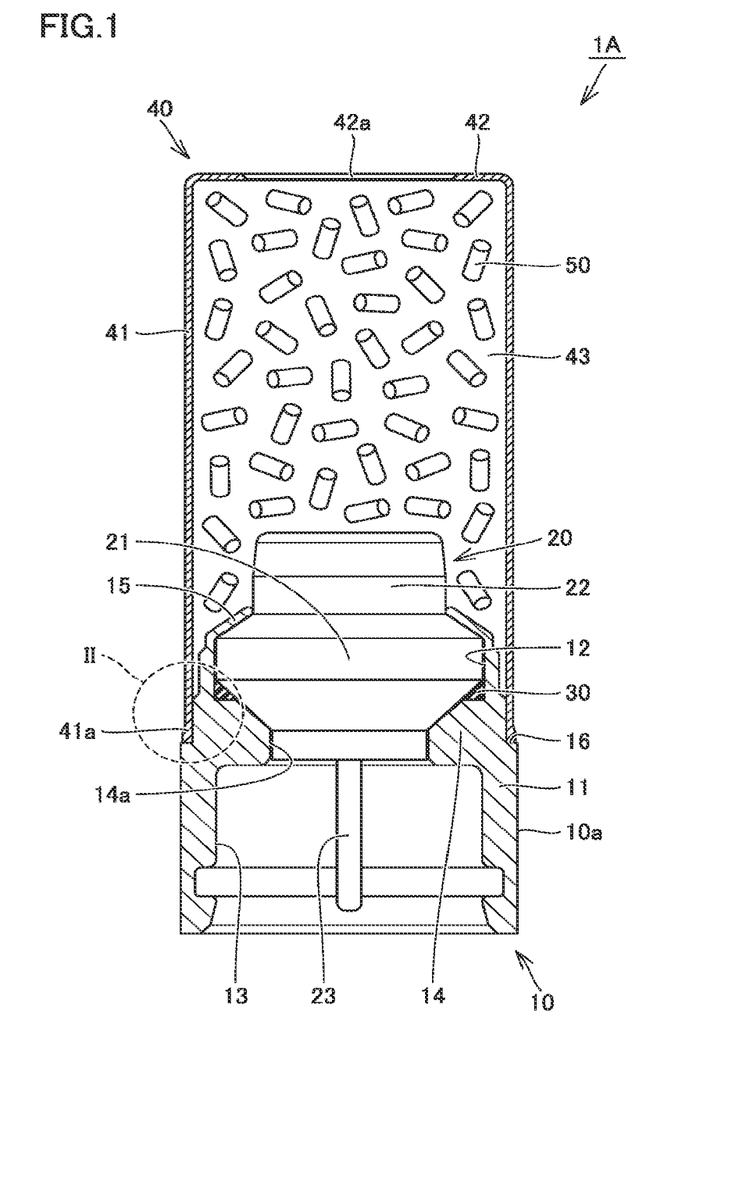
FIG. 1 is a schematic cross-sectional view of a gas generator according to a first embodiment.

FIG. 1 is a schematic cross-sectional view of a gas generator according to a first embodiment. A construction of a gas generator 1A according to the present embodiment will be described with reference to FIG. 1.

As shown in FIG. 1, gas generator 1A in the present embodiment mainly includes a holder 10, an igniter 20, a sealing member 30, a cup 40, and a gas generating agent 50.

Holder 10 and cup 40 as being coaxially combined with each other form a housing that serves as an outer shell of gas generator 1A. Igniter 20 is held by holder 10. Cup 40 is assembled to holder 10 to cover igniter 20. Gas generating agent 50 is accommodated in a space defined by holder 10, igniter 20, and cup 40.

Igniter 20 serves to ignite flame and it is also referred to as a squib. Igniter 20 includes a base 21, an ignition portion 22, and a pair of terminal pins 23. Base 21 is a site that holds ignition portion 22 and the pair of terminal pins 23 and it is also a site fixed to holder 10. The pair of terminal pins 23 is inserted in base 21 and held by base 21. Since the pair of terminal pins 23 is located as being superimposed in a direction orthogonal to the sheet plane in the figure, only one of them is seen.

Ignition portion 22 contains an ignition agent that ignites flame as it is ignited to burn at the time of activation and a resistor (bridge wire) for igniting the ignition agent. The pair of terminal pins 23 is connected to ignition portion 22 for igniting the ignition agent.

More specifically, ignition portion 22 includes a squib cup formed like a cup. The resistor described above is attached to couple tip ends of the pair of terminal pins 23 inserted in the squib cup to each other. The ignition agent is loaded in the squib cup to surround or adjoin the resistor.

Here, a Nichrome wire or the like is generally used as a resistor, and ZPP (zirconium potassium perchlorate), ZWPP (zirconium tungsten potassium perchlorate), lead tricinate, or the like is generally made use of as the ignition agent. The squib cup described above and a plug are generally made of a metal or plastic.

Upon sensing collision, a prescribed amount of current flows in a resistor through terminal pin 23. As the prescribed amount of current flows in the resistor, Joule heat is generated in the resistor and the ignition agent starts burning. Flame at a high temperature caused by burning bursts a squib cup accommodating the ignition agent. A time period from flow of a current in the resistor until activation of igniter 20 is generally not longer than 2 [ms] in a case that the Nichrome wire is employed as the resistor.

Cup 40 is made from a substantially cylindrical member with bottom including one axial end as an opening end 41a, and includes a sidewall 41 and a bottom wall 42. Opening end 41a is one end of a pair of axial ends of sidewall 41, that is opposite to a side where bottom wall 42 is located. Gas generating agent 50 is accommodated in an accommodation space 43 defined by sidewall 41 and bottom wall 42.

By providing a cut like a groove in a surface of bottom wall 42 of cup 40, a score 42a is provided. Score 42a is provided at a prescribed position in bottom wall 42 to form a weak portion weaker than other positions. By providing score 42a, cup 40 opens from that portion at the time of activation of gas generator 1A.

Cup 40 is also a member that forms a part of the housing, and made, for example, of a formed product of an iron-based material as represented by stainless steel. In general, pressing with the use of a die is used for forming cup 40.

Gas generating agent 50 produces a large amount of gas as it is ignited by igniter 20 to burn. A molding of smokeless powders (nitrocellulose) or a molding of a non-azide-based composition composed of an organic nitrogen compound and an oxidizing agent is employed as gas generating agent 50. Recently, use of a non-nitrocellulose-based gas generating agent extremely small in amount of generation of a harmful substance such as carbon monoxide has attracted attention as gas generating agent 50.

Moldings of gas generating agent 50 of various shapes such as a granule, a pellet, a column, and a disc shape can be employed. A molding with holes including through holes (for example, in a shape like macaroni or lotus root) can also be employed as the molding of gas generating agent 50. An optimal shape is selected depending on specifications of the pretensioner to which gas generator 1A is assembled. In addition to the shape, a size or the like of the molding of gas generating agent 50 is selected in consideration of a linear burning rate or a pressure exponent. Though an amount of loaded gas generating agent 50 may be varied as appropriate depending on specifications of the pretensioner to which the gas generator is assembled, in using smokeless powders, the amount is generally set approximately to 0.1 g to 2.0 g.

Holder 10 is a member for holding igniter 20 and cup 40, and substantially columnar. In the present embodiment, holder 10 is provided with a first recess 12, a second recess 13, and an opening 14a which will be described later. Therefore, holder 10 is substantially cylindrical.

Holder 10 is also a member that forms a part of the housing as described above, and made, for example, from a formed product of an iron-based material as represented by stainless steel. Holder 10 is formed into a shape as illustrated, for example, by forging, punching, and cutting each performed once or a plurality of times in a prescribed order.

Holder 10 includes a barrel portion 11 that defines an outer peripheral surface 10a which is a substantially circumferential surface. Barrel portion 11 is provided with first recess 12 and second recess 13. In a portion of barrel portion 11 located between first recess 12 and second recess 13, a partition portion 14 is formed to serve as a partition between first recess 12 and second recess 13. In a portion of barrel portion 11 located closer to bottom wall 42 of cup 40 described above than partition portion 14, a swaging collar 15 is formed.

First recess 12 is a site for accepting and holding base 21 of igniter 20, and provided at an axial end of barrel portion 11 on a side facing cup 40. A peripheral surface of first recess 12 is mainly defined by swaging collar 15, and a bottom surface of first recess 12 is defined by partition portion 14.

Second recess 13 is a site where the pair of terminal pins 23 of igniter 20 is arranged. Second recess 13 is a site for accepting and holding a connector (not shown) for external connection of igniter 20 with the pair of terminal pins 23 being interposed. Second recess 13 is provided at an axial end of barrel portion 11 on a side not facing cup 40. A peripheral surface of second recess 13 is defined by a cylindrical site of barrel portion 11 and a bottom surface of second recess 13 is defined by partition portion 14.

Partition portion 14 is provided with opening 14a as communicating with first recess 12 and second recess 13. Opening 14a is a portion into which a lower end of base 21 of igniter 20 is fitted.

Swaging collar 15 is a site for fixing by swaging base 21 of igniter 20 and is annular. Swaging collar 15 has a tip end bent inward, so that igniter 20 accommodated in first recess 12 is immovably fixed to holder 10.

In assembling igniter 20 to holder 10, igniter 20 is inserted into first recess 12 from the axial end of holder 10 on a side where first recess 12 is provided such that the pair of terminal pins 23 is inserted in opening 14a provided in partition portion 14. Base 21 is thus accommodated in first recess 12 and opening 14a, and the pair of terminal pins 23 is arranged in second recess 13. As the tip end of swaging collar 15 is bent toward base 21 in this state, base 21 is sandwiched between partition portion 14 and swaging collar 15 and thus igniter 20 is fixed by swaging to holder 10.

Sealing member 30 made from an O ring or the like is accommodated in advance in first recess 12 in holder 10. Sealing member 30 seals a gap produced between holder 10 and igniter 20. More specifically, sealing member 30 is located as being interposed between partition portion 14 and swaging collar 15 of holder 10, and base 21 of igniter 20. As sealing member 30 is compressed by holder 10 and igniter 20, sealing member 30 ensures sealability therebetween.

A member with sufficient heat resistance and durability is preferably employed as sealing member 30, and for example, an O ring made of EPDM which is one type of ethylene propylene rubber can suitably be employed.

In gas generator 1A according to the present embodiment, an annular step portion 16 is provided at a periphery of an axial end of holder 10 on a side facing cup 40. Opening end 41a of cup 40 is fitted to annular step portion 16. As welding is performed in a portion where annular step portion 16 and opening end 41a are fitted to each other, cup 40 is fixed to holder 10.

Various effects are obtained by adopting such a structure of assembly of cup 40 to holder 10. Details of the assembly structure and the effects obtained thereby will be described in detail later.

An operation of gas generator 1A in the present embodiment when it is activated will now be described with reference to FIG. 1.

With reference to FIG. 1, when a vehicle on which gas generator 1A in the present embodiment is mounted collides, collision is sensed by collision sensing means separately provided in the vehicle and igniter 20 is activated based thereon. When igniter 20 is activated, an ignition agent accommodated in ignition portion 22 is ignited to burn to burst the squib cup.

As a result of burst of the squib cup, flame ignited by burning of the ignition agent bursts into accommodation space 43 where gas generating agent 50 is accommodated. Gas generating agent 50 ignited by this flame burns to generate a large amount of gas in accommodation space 43. As gas generating agent 50 burns, an internal pressure in accommodation space 43 rapidly increases. Bottom wall 42 of cup 40 thus opens from score 42a, and the large amount of generated gas is emitted to the outside of gas generator 1A.

Thereafter, the large amount of gas emitted from gas generator 1A is guided to an activation space of the pretensioner incorporating gas generator 1A. The pretensioner is thus driven and the seat belt provided in the seat belt apparatus is strongly drawn.

Figure 2:
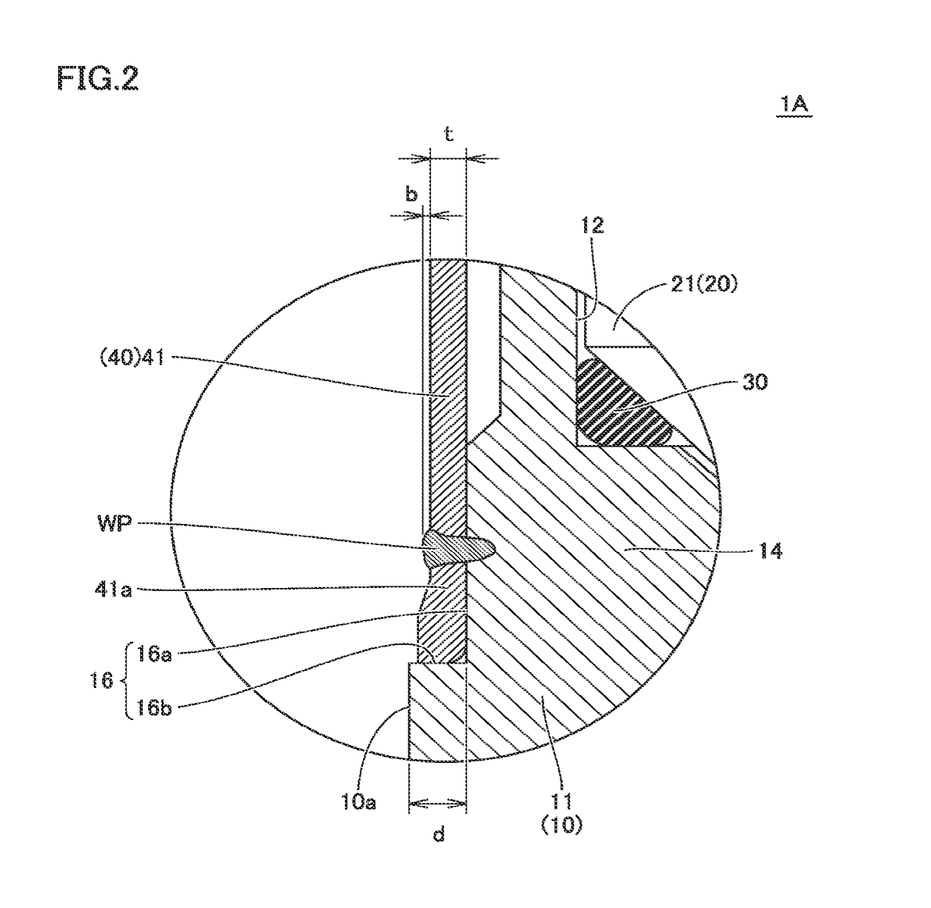
FIG. 2 is an enlarged view of a region II shown in FIG. 1.

FIG. 2 is an enlarged view of a region II shown in FIG. 1. A structure of assembly of cup 40 to holder 10 in gas generator 1A according to the present embodiment will now be described in detail with reference to FIG. 2 and FIG. 1 described previously.

Referring to FIGS. 1 and 2, in gas generator 1A according to the present embodiment, annular step portion 16 is provided at the periphery of the axial end of holder 10 on the side facing cup 40, and opening end 41a of cup 40 is fitted to annular step portion 16.

As shown in FIG. 2, annular step portion 16 includes a first step forming surface 16a formed from a circumferential surface continuous to an axial end surface of holder 10 on the side facing cup 40 and an annular planar second step forming surface 16b continuous to outer peripheral surface 10a defined by barrel portion 11 of holder 10. Thus, at the periphery of the axial end of holder 10 on the side facing cup 40, a cylindrical space defined by first step forming surface 16a and second step forming surface 16b is located. Opening end 41a of cup 40 is cylindrical.

Therefore, as cylindrical opening end 41a is inserted into the cylindrical space defined by first step forming surface 16a and second step forming surface 16b described above, opening end 41a of cup 40 is fitted to annular step portion 16 of holder 10 as described above. Opening end 41a of cup 40 is preferably pressed to annular step portion 16 of holder 10.

An inner peripheral surface of opening end 41a of cup 40 thus abuts on first step forming surface 16a of annular step portion 16 of holder 10, and a tip end surface of opening end 41a of cup 40 abuts on second step forming surface 16b of annular step portion 16 of holder 10.

In gas generator 1A according to the present embodiment, welding is performed in a portion where annular step portion 16 of holder 10 and opening end 41a of cup 40 are fitted to each other, so that an annular welded portion WP as a point of joint to annular step portion 16 as extending along the circumferential direction of cup 40 is provided at the opening end of cup 40. More specifically, annular welded portion WP is provided in a portion where the inner peripheral surface of opening end 41a is opposed to first step forming surface 16a of annular step portion 16 so as to join them to each other, so that cup 40 is fixed to holder 10.

Preferably, laser welding is adopted as welding described above. When this laser welding is adopted, annular welded portion WP described above is made up of a laser welded portion where opening end 41a is joined by laser welding to annular step portion 16.

According to such a construction, not only cup 40 is fixed to holder 10 by providing annular welded portion WP, but also a gap that may be produced between holder 10 and cup 40 is sealed by annular welded portion WP. Therefore, sealability between holder 10 and cup 40 can be ensured by a simple process to fit cup 40 to holder 10 and to perform welding.

Thus, a sealing member such as an O ring does not have to separately be interposed, or sealing treatment by application and curing of a liquid sealant does not have to be performed. Therefore, the number of components can be reduced and the manufacturing process can be simplified.

By adopting the construction, burr that may be produced in fixing by swaging the cup to the holder or buckling of the holder naturally does not occur. Therefore, manufacturing can be facilitated and yield can also be improved.

Furthermore, by adopting the construction, as compared with an example in which the cup is fixed by swaging to the holder, the flange for fixing by swaging does not have to be provided at the opening end of the cup either. Therefore, the maximum outer dimension in the radial direction of the holder can be smaller, and the gas generator can also be smaller in this regard.

Therefore, with gas generator 1A according to the present embodiment, a gas generator that can easily be manufactured with lower cost and can be compact can be provided.

Gas generator 1A according to the present embodiment can be assembled to a pretensioner by various assembly structures. In general, the gas generator is assembled by being pressed and welded to the opening end located at one axial end of a cylindrical casing serving as an outer shell of the pretensioner. In that case, outer peripheral surface 10a of holder 10 of gas generator 1A is welded to the casing. Therefore, the maximum outer dimension in the radial direction of gas generator 1A should be defined by holder 10.

In gas generator 1A according to the present embodiment, as shown in FIGS. 1 and 2, the maximum outer dimension in the radial direction of cup 40 including annular welded portion WP is smaller than the maximum outer dimension in the radial direction of holder 10. Specifically, a swelling called a bead may be produced in annular welded portion WP at the time of welding. The maximum outer dimension in the radial direction of cup 40 including the bead, however, is smaller than the maximum outer dimension in the radial direction of holder 10.

Referring to FIG. 2, such a construction can be realized by satisfying a condition of d>t+b where d represents a depth of annular step portion 16 along the radial direction of holder 10, t represents a thickness of opening end 41a, and b represents a maximum height of a bead that may be produced. Therefore, the construction described above can reliably be obtained by obtaining maximum height b of the bead in advance by conducting tests and determining depth d of annular step portion 16 and thickness t of opening end 41a based thereon. In this case, the condition of d>t is satisfied in relation between depth d of annular step portion 16 and thickness t of opening end 41a. When a margin does not have to particularly be taken into account, the condition of d=t+b may be satisfied.

With gas generator 1A according to the present embodiment, preferably, holder 10 and cup 40 are both made of the iron-based material as described above. With such a construction, laser welding described above can readily be performed. In general, when one of holder 10 and cup 40 is made of an aluminum-based material, it is very difficult to perform laser welding.

Holder 10 and cup 40 made of the iron-based material are larger in weight than holder 10 and cup 40 made of the aluminum-based material. The iron-based material, however, is higher in mechanical strength than the aluminum-based material. Therefore, holder 10 and cup 40 can be reduced in size (thickness) accordingly, and increase in weight can also be suppressed accordingly.

By way of example, in designing the gas generator to obtain specific equal gas output with the holder and the cup being made of the aluminum-based material, the cup should have a thickness of 0.5 [mm] and the barrel portion of the holder should have a thickness (a thickness of a portion of the holder corresponding to the peripheral surface of the second recess) of 2.9 [mm]. With the holder and the cup being made of the iron-based material, the cup can have a smaller thickness of 0.3 [mm] and the barrel portion of the holder can have a smaller thickness of 1.5 [mm].

Therefore, with gas generator 1A according to the present embodiment, reduction in size can be achieved while increase in weight is suppressed, and a sufficiently large amount of loaded gas generating agent 50 can be ensured.

In addition, in gas generator 1A according to the present embodiment, as shown in FIGS. 1 and 2, annular step portion 16 is provided to reach outer peripheral surface 10a of the portion of holder 10 surrounding partition portion 14 and annular welded portion WP is provided in the portion of opening end 41a surrounding partition portion 14.

In this regard, annular step portion 16 may be provided only in outer peripheral surface 10a in the portion of holder 10 defined by a root of swaging collar 15 (that is, a portion connected to partition portion 14) or may be provided to reach outer peripheral surface 10a in the portion of holder 10 corresponding to the peripheral surface of second recess 13. In that case, annular welded portion WP may be provided in the portion of opening end 41a surrounding the root of swaging collar 15 or in the portion of opening end 41a surrounding second recess 13.

In the construction as in the present embodiment described above, annular welded portion WP provided at opening end 41a of cup 40 is welded to a portion of holder 10 (that is, partition portion 14) where a thickness in the radial direction is sufficiently large. Therefore, not only strength in assembly of cup 40 to holder 10 can be enhanced but also an amount of pressing cup 40 to holder 10 (that is, a length of pressing along a direction of pressing) can be reduced to minimum necessary. Therefore, a gas generator high in mechanical strength can be provided and buckling at the time of pressing cup 40 can be prevented.

Referring to FIG. 2, in the present embodiment, an example in which annular welded portion WP is provided in a part of a portion where the inner peripheral surface of opening end 41a and first step forming surface 16a of annular step portion 16 are opposed to each other so as to join them to each other is described and illustrated. Annular welded portion WP, however, may be provided in the entire portion where the inner peripheral surface of opening end 41a and first step forming surface 16a of annular step portion 16 are opposed to each other so as to join them to each other, or may be provided in a part or the entirety of the portion where the tip end surface of opening end 41a and second step forming surface 16b of annular step portion 16 are opposed to each other so as to join them to each other. Furthermore, annular welded portion WP may be provided across both of the portion where the inner peripheral surface of opening end 41a and first step forming surface 16a of annular step portion 16 are opposed to each other and the portion where the tip end surface of opening end 41a and second step forming surface 16b of annular step portion 16 are opposed to each other, or may independently be provided in each of them.

When variation in dimension in cup 40 or holder 10 is taken into consideration, in pressing cup 40 to holder 10, the tip end surface of opening end 41a of cup 40 does not have to abut on second step forming surface 16b of annular step portion 16. In that case, after pressing, a gap is produced between the tip end surface of opening end 41a and second step forming surface 16b of annular step portion 16. According to such a construction, not only variation in dimension described above can be accommodated in the gap but also the amount of pressing can be smaller. In that case, annular welded portion WP should only be provided in a part or the entirety of the portion where the inner peripheral surface of opening end 41a and first step forming surface 16a of annular step portion 16 are opposed to each other so as to join them to each other.

Second Embodiment

Figure 3:
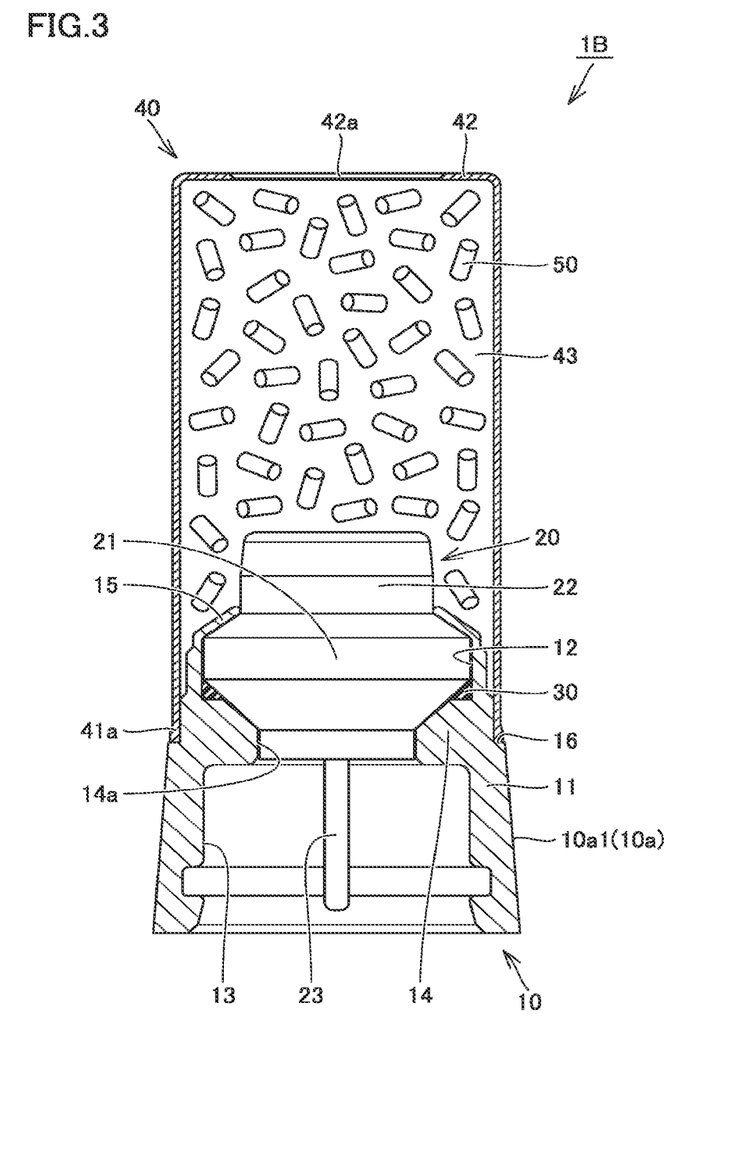
FIG. 3 is a schematic cross-sectional view of a gas generator according to a second embodiment.

FIG. 3 is a schematic cross-sectional view of a gas generator according to a second embodiment. A gas generator 1B according to the present embodiment will be described below with reference to FIG. 3.

As shown in FIG. 3, gas generator 1B according to the present embodiment is different from gas generator 1A according to the first embodiment described above only in shape of holder 10. Specifically, outer peripheral surface 10a of holder 10 of gas generator 1B is formed by a tapered surface 10a1 gradually decreasing in diameter from the axial end of holder 10 on the side not facing cup 40 toward annular step portion 16 provided in holder 10.

According to such a construction, in pressing gas generator 1B into an opening end located at one axial end of a cylindrical casing serving as an outer shell of the pretensioner, pressing is facilitated and holder 10 of gas generator 1B and the casing of the pretensioner can be in intimate contact with each other after assembly.

Therefore, with gas generator 1B according to the present embodiment, in addition to the effects described in the first embodiment described above, a gas generator more suitable for assembly to the pretensioner can be provided.

Third Embodiment

Figure 4:
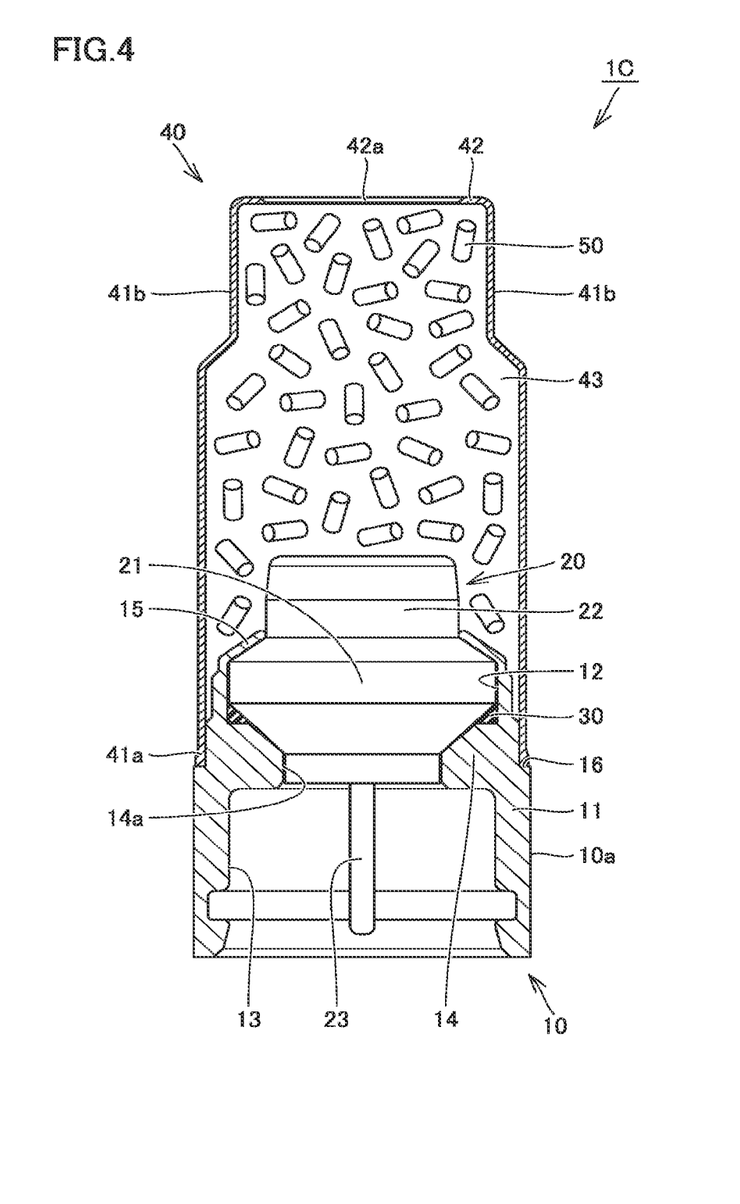
FIG. 4 is a schematic cross-sectional view of a gas generator according to a third embodiment.

FIG. 4 is a schematic cross-sectional view of a gas generator according to a third embodiment. A gas generator 1C according to the present embodiment will be described below with reference to FIG. 4.

As shown in FIG. 4, gas generator 1C according to the present embodiment is different from gas generator 1A according to the first embodiment described above only in shape of cup 40. Specifically, a pair of flat planar portions 41b is provided at an end of sidewall 41 on a side of bottom wall 42 in cup 40 of gas generator 1C. The pair of planar portions 41b is provided to be opposed to each other in a direction orthogonal to a direction in which the pair of terminal pins 23 of igniter 20 is aligned.

According to such a construction, the pair of planar portions 41b can serve as a positioning marker in a circumferential direction in pressing gas generator 1A into the opening end located at one axial end of the cylindrical casing serving as the outer shell of the pretensioner.

Therefore, with gas generator 1C according to the present embodiment, in addition to the effects described in the first embodiment described above, a gas generator more suitable for assembly to the pretensioner can be provided.

Another Form

Though an example in which the cup is joined to the holder by laser welding is described and illustrated in the first to third embodiments above, alternatively, the cup may be joined to the holder by friction welding or resistance welding.

Characteristic features disclosed in the first to third embodiments described above can be combined with one another without departing from the gist of the present invention.

The embodiments disclosed herein are thus illustrative and non-restrictive in every respect. The technical scope of the present invention is delimited by the terms of the claims, and includes any modifications within the scope and meaning equivalent to the terms of the claims.

REFERENCE SIGNS LIST 1A to 1C gas generator; 10 holder; 10a outer peripheral surface; 10a1 tapered surface; 11 barrel portion; 12 first recess; 13 second recess; 14 partition portion; 14a opening; 15 swaging collar; 16 annular step portion; 16a first step forming surface; 16b second step forming surface; 20 igniter; 21 base; 22 igniter; 23 terminal pin; 30 sealing member; 40 cup; 41 sidewall; 41a opening end; 41b planar portion; 42 bottom wall; 42a score; 43 accommodation space; 50 gas generating agent; WP annular welded portion

The invention claimed is:

1. A gas generator comprising:
   a gas generating agent that generates gas as the gas generating agent burns;
   an igniter including an ignition portion loaded with a terminal pin connected to the ignition portion;
   a cylindrical cup having a bottom portion configured to accommodate the gas generating agent, the cylindrical cup including one axial end as an opening end; and
   a columnar holder to which the cup is coaxially assembled to close the opening end, the columnar holder holding the igniter such that the ignition portion faces the gas generating agent, wherein
   an annular step portion is provided at a periphery of an axial end of the holder on a side facing the cup, and
   the cup is fixed to the holder by fitting the opening end to the annular step portion and providing an annular welded portion at the opening end, the annular welded portion being, joined to the annular step portion so as to extend along a circumferential direction of the cup, wherein a maximum outer dimension in a radial direction of the cup including the annular welded portion is equal to or smaller than a maximum outer dimension in the radial direction of the holder, wherein a maximum outer dimension in a radial direction of the cup in a portion fitted to the annular step portion except for the annular welded portion is smaller than a maximum outer dimension in the radial direction of the holder, wherein the opening end of the cup is substantially in a straight cylindrical shape, wherein the annular step portion is defined by a first step forming surface formed from a peripheral surface of the holder continuous to the axial end surface of the holder on the side facing the cup and an annular planar second step forming surface continuous to the first step forming surface and continuous to the outer peripheral surface of the holder, and wherein the annular welded portion is provided at the opening end of the cup in a portion facing the first step forming surface, at a position distant from a tip end surface of the opening end of the cup, so as to be joined to the first step forming surface without being joined to the second step forming surface.

2. The gas generator according to claim 1, wherein
the igniter further includes a base in which the terminal pin is inserted and held,
the holder includes
   a first recess provided at the axial end on the side facing the cup, the first recess accepting and holding the base,
   a second recess provided at an axial end on a side not facing the cup, the terminal pin being arranged in the second recess, and
   a partition portion that serves as a partition between the first recess and the second recess by defining a bottom surface of the first recess and a bottom surface of the second recess, the partition portion being provided with an opening in which the igniter is inserted, and
the annular step portion is provided to reach an outer peripheral surface of the holder in a portion of the holder surrounding the partition portion, and the annular welded portion is provided in a portion of the opening end that surrounds the partition portion.

3. The gas generator according to claim 1, wherein
the annular welded portion is a laser welded portion where the opening end is joined to the annular step portion by laser welding.

4. The gas generator according to claim 1, wherein
the cup and the holder are both made of an iron-based material.

* * * * *